(12) United States Patent
Saura

(10) Patent No.: US 9,996,860 B2
(45) Date of Patent: Jun. 12, 2018

(54) EFFICIENT PROMOTION MODEL

(71) Applicant: Microsoft Corporation, Redmond, WA (US)

(72) Inventor: Jose Saura, Kent, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 678 days.

(21) Appl. No.: 14/529,537

(22) Filed: Oct. 31, 2014

(65) Prior Publication Data
US 2016/0125478 A1    May 5, 2016

(51) Int. Cl.
*G06Q 30/00* (2012.01)
*G06Q 30/02* (2012.01)

(52) U.S. Cl.
CPC ..... *G06Q 30/0277* (2013.01); *G06Q 30/0214* (2013.01); *G06Q 30/0246* (2013.01); *G06Q 30/0255* (2013.01)

(58) Field of Classification Search
CPC ................................................ G06Q 30/0251
USPC .......................................................... 705/14
See application file for complete search history.

(56) References Cited

U.S. PATENT DOCUMENTS

| | | | |
|---|---|---|---|
| 6,999,941 B1 * | 2/2006 | Agarwal | G06Q 30/06 705/26.2 |
| 7,702,536 B1 | 4/2010 | Alabraba et al. | |
| 8,306,874 B2 | 11/2012 | Morgenstern et al. | |
| 9,171,326 B2 * | 10/2015 | Pavlidis | G06Q 50/01 |
| 2005/0096982 A1 | 5/2005 | Morton et al. | |
| 2008/0189188 A1 * | 8/2008 | Morgenstern | G06Q 30/02 705/14.39 |
| 2009/0234730 A1 | 9/2009 | Lee | |
| 2010/0280879 A1 * | 11/2010 | O'Sullivan | G06Q 30/02 705/14.19 |
| 2011/0153502 A1 * | 6/2011 | Jean-Claude | G06Q 20/3672 705/66 |
| 2011/0231239 A1 * | 9/2011 | Burt | G06Q 30/02 705/14.41 |
| 2012/0030027 A1 * | 2/2012 | Nomula | G06F 17/30867 705/14.66 |

(Continued)

OTHER PUBLICATIONS

"Buddy program", Published on: Mar. 7, 2010, pp. 3 Available at: https://wiki.eveonline.com/en/wiki/Buddy_program.

(Continued)

*Primary Examiner* — Matthew L Hamilton
(74) *Attorney, Agent, or Firm* — Talem IP Law, LLP

(57) ABSTRACT

One or more techniques and/or systems are provided for promoting a service using a gifting model. For example, a gifting model, for a service (e.g., a multimedia content service that provides movies, music, apps, etc.), may specify what types of online users are eligible to be promoters and/or what online promotional gifts are available for promoters to gift to online recipient users. In an example, one or more online promotional gifts (e.g., a television show, a song, etc.) of the multimedia content service are exposed to an online user. A gift request is received from the online user. The gift request may specify an online recipient user and a selected online promotional gift (e.g., an action movie). The online promotional gift is provided to the online recipient user. In this way, online users may promote a service by providing promotional gifts, such as for free, to online recipient users.

17 Claims, 10 Drawing Sheets

(56) References Cited

U.S. PATENT DOCUMENTS

| | | | |
|---|---|---|---|
| 2012/0066041 A1* | 3/2012 | Mankoff | G06Q 20/0457 |
| | | | 705/14.17 |
| 2012/0158455 A1* | 6/2012 | Pathak | G06Q 30/0201 |
| | | | 705/7.29 |
| 2012/0173333 A1* | 7/2012 | Berger | G06Q 30/0251 |
| | | | 705/14.49 |
| 2012/0316948 A1* | 12/2012 | Shipley | G06Q 30/02 |
| | | | 705/14.23 |
| 2012/0330736 A1 | 12/2012 | Beckner et al. | |
| 2013/0073430 A1* | 3/2013 | Gallen | G06Q 50/01 |
| | | | 705/26.41 |
| 2013/0132294 A1* | 5/2013 | Schvey | G06Q 30/0207 |
| | | | 705/319 |
| 2013/0211971 A1 | 8/2013 | Lin et al. | |
| 2013/0275179 A1* | 10/2013 | Marshall | G06Q 30/0214 |
| | | | 705/7.29 |
| 2013/0304582 A1* | 11/2013 | Beazley | G06Q 30/0251 |
| | | | 705/14.64 |
| 2013/0332308 A1* | 12/2013 | Linden | G06Q 30/0631 |
| | | | 705/26.7 |
| 2014/0019225 A1* | 1/2014 | Guminy | G06Q 30/02 |
| | | | 705/14.39 |
| 2014/0046742 A1* | 2/2014 | Goodman | G06Q 30/0201 |
| | | | 705/14.16 |
| 2014/0081769 A1* | 3/2014 | Wilen | G06Q 20/354 |
| | | | 705/14.66 |
| 2014/0108177 A1* | 4/2014 | Erke | G06Q 30/0601 |
| | | | 705/26.1 |
| 2014/0257921 A1* | 9/2014 | Bear | G06Q 30/0269 |
| | | | 705/7.29 |
| 2014/0358717 A1* | 12/2014 | Clark | G06Q 30/0621 |
| | | | 705/26.5 |
| 2015/0066615 A1* | 3/2015 | Gandhi | G06Q 50/01 |
| | | | 705/14.16 |
| 2015/0112778 A1* | 4/2015 | Feldman | G06Q 30/0269 |
| | | | 705/14.16 |
| 2015/0205802 A1* | 7/2015 | Levinsky | G06Q 50/01 |
| | | | 707/706 |
| 2015/0348123 A1* | 12/2015 | Darwin | G06Q 30/0269 |
| | | | 705/14.66 |
| 2016/0005028 A1* | 1/2016 | Mayblum | G06Q 20/342 |
| | | | 705/26.81 |
| 2016/0012491 A1* | 1/2016 | Shah | G06Q 30/0269 |
| | | | 705/14.58 |
| 2016/0019630 A1* | 1/2016 | Vippagunta | G06Q 30/0631 |
| | | | 705/26.8 |
| 2016/0071175 A1* | 3/2016 | Reuss | G06Q 30/0607 |
| | | | 705/26.25 |
| 2017/0262886 A1* | 9/2017 | Raina | G06Q 30/0257 |

OTHER PUBLICATIONS

"Playing with friends pays off!", Published on: Aug. 12, 2013, pp. 3 Avialable at: http://www.swtor.com/info/friends.

"Referral: Send Gift to New Subscriber", Retrieved date: Apr. 29, 2014, pp. 2 Avialable at: https://zapier.com/zapbook/mailchimp/mailgun/7545/referral-send-gift-to-new-subscriber/.

Aral, et al., "Creating Social Contagion Through Viral Product Design: A Randomized Trial of Peer Influence in Networks", In Journal of Management Science, vol. 57, Issue 9, Sep. 1, 2011, 17 pages. http://dylantwalker.com/wp-content/uploads/2013/11/Creating-Social-Contagion-Through-Viral-Product-Deisign-Aral-and-Walker-Management-Science-2011.pdf.

"iTunes: Sending iTunes Gifts", Retrieved on: May 1, 2014, pp. 6 Available at: http://support.apple.com/kb/ht2736.

* cited by examiner

EFFICIENT PROMOTION MODEL

BACKGROUND

Many users may utilize services to discover, explore, obtain, and engage with content. In an example, a user may purchase movies through a movie streaming service. In another example, the user may purchase apps through an app store. In another example, the user may purchase varying degrees of access to articles through an article repository website. In this way, users may purchase content, such as videos, music, applications, images, information, and/or a variety of other content, through various types of services.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

Among other things, one or more systems and/or techniques for promoting a service using a gifting model are provided herein. In an example of promoting a service using a gifting model, a gifting model is utilized to evaluate an online user to determine that the online user is eligible to be a promoter for promotion based gifting. One or more online promotional gifts of a service are exposed to the online user. A gift request is received from the online user. The gift request specifies an online recipient user and an online promotional gift selected from the one or more online promotional gifts. The online promotional gift is provided to the online recipient user. In an example of promoting a service, responsive to an online user accessing a content item of a service through a service user interface, the service user interface is populated with a gifting user interface element exposing the content item as an online promotional gift. A gift request is received from the online user. The gift request specifies that an online recipient user is to be a recipient for the online promotional gift. The online promotional gift is provided to the online recipient user.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
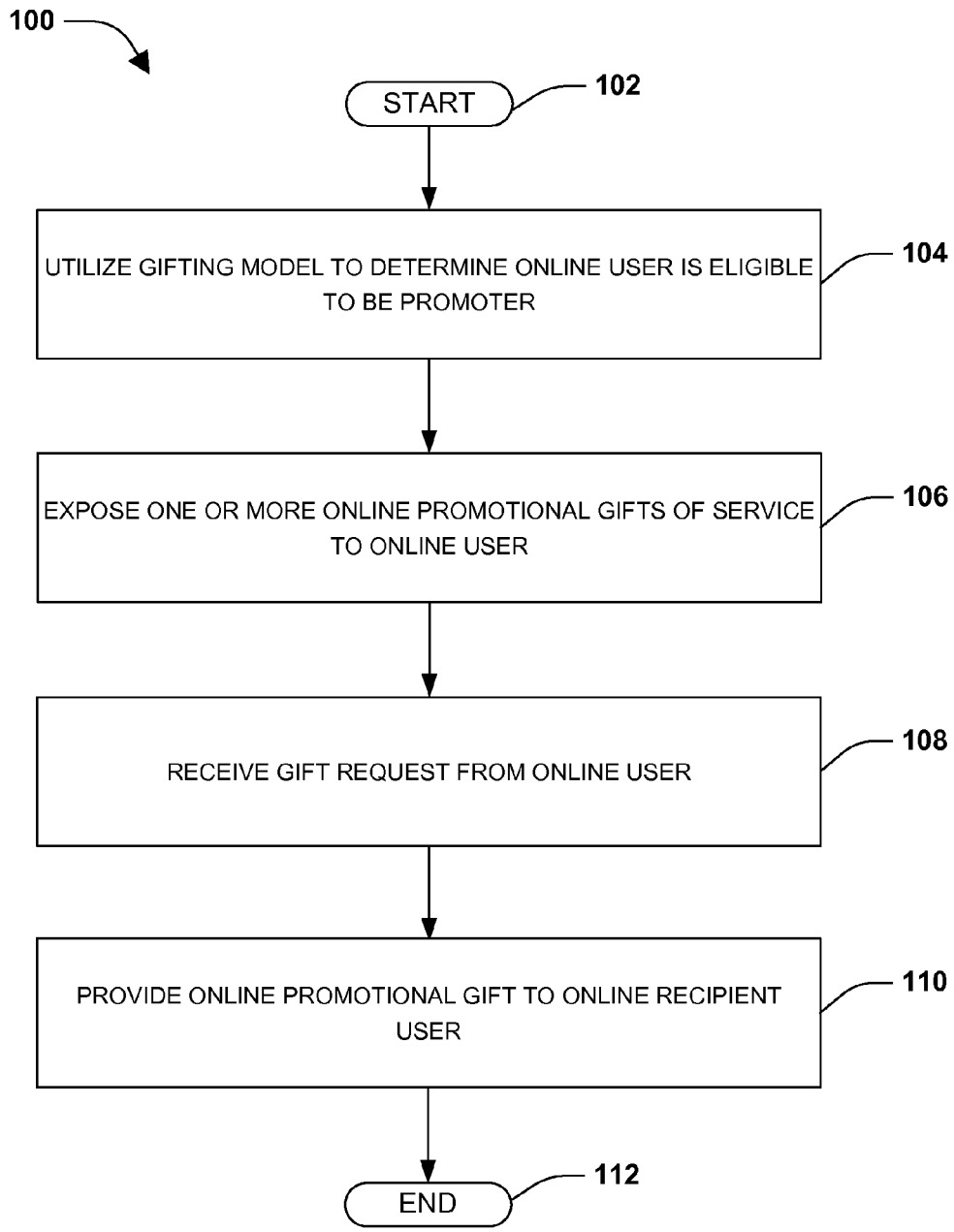
FIG. 1 is a flow diagram illustrating an exemplary method of promoting a service using a gifting model.

The claimed subject matter is now described with reference to the drawings, wherein like reference numerals are generally used to refer to like elements throughout. In the following description, for purposes of explanation, numerous specific details are set forth to provide an understanding of the claimed subject matter. It may be evident, however, that the claimed subject matter may be practiced without these specific details. In other instances, structures and devices are illustrated in block diagram form in order to facilitate describing the claimed subject matter.

One or more systems and/or techniques for promoting a service using a gifting model are provided herein. A service, such as a multimedia content provider service, may desire to promote services and/or content provided by the service (e.g., movie streaming, music streaming, apps available for purchase, etc.). The service may devote substantial computing resources (e.g., servers, network bandwidth, memory, processing resources, etc.) for identifying and reaching out to potential customers that may potentially find the services and/or content useful. Unfortunately, many attempts to reach out to potential customers may not result in conversions (e.g., a subscription to a service, a purchase of content, utilization of a promotion, etc.) for various reasons, such as a lack of interest, which may result in wasted computing resources (e.g., unnecessary consumption of bandwidth, processing resources, etc.). Accordingly, as provided herein, an online user may be identified as a promoter for a service such that the promoter may send online promotional gifts of a service to online recipient users according to a gifting model, but online users that are not determined to be eligible as promoters may not be afforded the opportunity to send online promotional gifts of the service thereby mitigating unnecessary, inefficient, etc. computing resource utilization. For example, identifying the online user as an eligible promoter may indicate that the online user may have more intimate knowledge of which online recipient users may find the service interesting (e.g., the online user may send action movie gifts to other friends that enjoy movies and/or action movies), and thus online promotional gifts sent by the online user may be more likely to result in conversions. Computing resources are therefore less likely to be used generating and/or providing online promotional gifts to recipient users that are not likely to result in conversions. For example, fewer overall online promotional gifts may be sent because merely online users that are determined to be eligible to be promoters may send online promotional gifts and/or fewer overall online promotional gifts may be sent because online promotional gifts that are sent are deemed to have an increased probability of leading to conversions (e.g., and thus mass mailings of online promotional gifts may not be needed). Computing resources are thereby conserved.

An embodiment of promoting a service using a gifting model is illustrated by an exemplary method 100 of FIG. 1. At 102, the method starts. A service, such as a multimedia content service, may specify a gifting model that may be used to provide online users with opportunities to send online promotional gifts to online recipient users. For example, the gifting model may allow an online user to send an online promotional gift to an online recipient user, where the online promotional gift is free or provided at a substantially reduced rate to the online recipient user. The online promotional gift may promote the service to the recipient, which may result in efficient and targeted promotion of the service because the online user may have a personal relationship with the online recipient user and/or may have personal knowledge that the online recipient user may have an interest in the online promotional gift and thus the service. Accordingly, computing resources are conserved by not providing online promotional gifts to online recipient users that are less likely to be interested in services associated with the online promotional gifts, or rather the (e.g., reduced number of) online promotional gifts that are sent to online recipient users are deemed to be more likely to result in conversions. In an example, one or more promoter demographic clusters may be constructed for the gifting model (e.g., a first promoter demographic cluster may correspond to teenagers, a second promoter demographic cluster may correspond to parents, a third promoter demographic cluster may correspond to chefs, etc.). Available online promotional gifts may be assigned to the one or more promoter demographic clusters (e.g., 50 pop music song plays may be assigned to the first promoter demographic cluster, 100 children television show viewings may be assigned to the second promoter demographic cluster, 30 cooking app downloads may be assigned to the third promoter demographic cluster, etc.). In this way, online promotional gifts may be tailored to certain types of promoters that may have an interest in providing certain types of online promotional gifts to online recipient users. Thus, responsive to an online user corresponding to a promoter demographic cluster, the online user may be determined as eligible to be a promoter for one or more online promotional gifts assigned to the promoter demographic cluster.

At 104, the gifting model may be utilized to evaluate an online user to determine that the online user is eligible to be a promoter for promotion based gifting so that computing resources are conserved by sending targeted online promotional gifts that have a relatively high likelihood of leading to conversions. For example, the online user may correspond to the second promoter demographic cluster that has at least one remaining children television show viewing to allocate to a promoter. Various fraud detection techniques may be utilized to determine that the online user is eligible to be the promoter. For example, a location, such as an IP address, of the online user having an account with the multimedia content service may be identified. Responsive to the location corresponding to a threshold number of online users (e.g., 10 or more accounts may have been recently created from the IP address), the online user may be determined to not be eligible to be the promoter (e.g., to prevent the online user from abusing the ability to send online promotional gifts using a plethora of different accounts). In an example, the online user may be tested to determine that the online user may be a beneficial promoter of the multimedia content service. For example, the online user may be provided with an online promotional test gift opportunity corresponding to an online promotional test gift (e.g., 3 children television show viewings may be provided to the online user for promotional gifting). A result of the online promotional test gift opportunity may be evaluated to determine whether the online user is eligible to be the promoter. The result may comprise a target online recipient user of the online promotional test gift (e.g., the online user may become suspect and/or ineligible to be the promoter if the online user sends an online promotional test gift to herself). The result may specify whether a conversion (e.g., the online target recipient uses the online promotional test gift; the online target recipient subscribes to the multimedia content service; the online target recipient makes a purchase from the multimedia content service; etc.) results from the online promotional test gift opportunity. A conversion may indicate that the online user is a good candidate to be the promoter.

At 106, one or more online promotional gifts of the service may be exposed to the online user, but may not be exposed to online users that are not determined to be eligible to be promoters to conserve computing resources (e.g., so that online promotional gifts are merely sent by online users determined to be eligible to be promoters, so that fewer promotional gifts are sent overall, etc.). In an example, an online promotional gift may correspond to content, otherwise available for purchase from the service, which may be gifted by the online user for free or at a reduced rate to an online recipient user. In an example, a content type user interest of the online user may be generated based upon various information (e.g., a social network profile of the online user may indicate that the online user likes watching television with her children; children based content purchased by the online user from the multimedia content service; types of online promotional gifts provided by the online user to online recipient users; etc.). The one or more online promotional gifts may be selected for exposure to the online user based upon the content type user interest (e.g., children based online promotional gifts may be selected based upon the user consuming children based content from the multimedia content service). In an example, a promoter profile for the online user may be generated based upon online promotional gifts previously provided to online recipient users on behalf of the online user. The one or more online promotional gifts may be selected for exposure to the online user based upon the promoter profile (e.g., if the online user has a propensity to send children alphabet television shows to other parents, then a children alphabet television show online promotional gift may be provided to the online user). The online user may take affirmative action, such as providing opt-in consent, to allow access to and/or use of information (e.g., social network profile of the online user, content purchases of the online user, gifts provided by the online user, etc.), such as for the purpose of identifying a content type user interest and/or promoter profile of the online user (e.g., where the online user responds to a prompt regarding the collection and/or use of such information).

In an example of exposing online promotional gifts, the one or more online promotional gifts may be exposed through a service user interface of the service. For example, the online user may navigate to a movies section of a multimedia content service user interface of the multimedia content service. The multimedia content service user interface may display information regarding an Alphabet Adventure show. A gifting user interface element may be displayed for the Alphabet Adventure show (e.g., a button through which the online user may send the Alphabet Adventure show as an online promotional gift to an online recipient user). The gifting user interface element may indicate a number of remaining promotional gifting opportunities available to the online user. In an example of exposing online promotional gifts, a gifting user interface (e.g., a summary webpage or interface through which the online user may view, select, and/or send online promotional gifts) may be displayed to the online user. The gifting user interface may be populated with one or more online promotional gifts based upon the promoter profile of the online user.

At 108, a gift request may be received from the online user. The gift request may specify an online recipient user and an online promotional gift selected from the one or more promotional gifts (e.g., the Alphabet Adventure show). At 110, the online promotional gift may be provided to the online recipient user. In an example, a content access token may be generated for accessing content, such as the Alphabet Adventure show, of the online promotional gift. The content access token may be provided to the online recipient user based upon an email, a message, a social network post, a URL, a text message, or through any other type of communication. In an example, the online recipient user may correspond to a social network user profile (e.g., a profile of the online user, a profile of a different user, etc.). A social network gift post of the online promotional gift may be created. The social network gift post may be used to specify a threshold number of online recipient users capable of gaining access to the online promotional gift (e.g., the social network gift post may comprise a URL to the Alphabet Adventure show and may indicate that the first 10 users of the URL may be allowed to watch the Alphabet Adventure show for free).

In an example, a recipient profile for the online recipient user may be generated based upon one or more online promotional gifts consumed by the online recipient user. A content type user interest of the online recipient user may be identified based upon the online promotional gift and/or the recipient profile. For example, the online recipient user may receive and consume various children based movies and songs. A targeted promotional offer may be provided to the online recipient user based upon the content type user interest and/or the recipient profile. For example, a 20% promotion to purchase a children based song may be provided to the online recipient user. The online recipient user may take affirmative action, such as providing opt-in consent, to allow access to and/or use of information (e.g., one or more online promotional gifts consumed by the online recipient user, etc.), such as for the purpose of identifying a content type user interest and/or recipient profile of the online recipient user (e.g., where the online recipient user responds to a prompt regarding the collection and/or use of such information).

In an example, a result of the online promotional gift may be identified (e.g., the online recipient user may ignore the Alphabet Adventure show, the online recipient user may watch the Alphabet Adventure show, the online recipient user may subscribe to the multimedia content service, the online recipient user may purchase a song from the multimedia content service, etc.). The online user may be provided with a reward based upon the result indicating that a conversion occurred based upon the online promotional gift (e.g., a purchase, a new subscription, consumption of the Alphabet Adventure show, etc.). The reward may comprise access to content provided by the service (e.g., a free movie), a monetary reward, access to a service feature of the service (e.g., free music streaming for a week), a new online promotional gift opportunity (e.g., the ability to provide a new online promotional gift to a second online recipient user). In an example, a gifting summary user interface may be displayed to the online user. The gifting summary user interface may be populated with one or more previously provided online promotional gifts, previous online recipient users of the one or more previously provided online promotional gifts, results of the one or more previously provided online promotional gifts (e.g., whether conversions occurred), etc. In this way, the gifting model may be used for promoting the service by allowing online users to provide online promotional gifts, such as for free, to online recipient users. It will be appreciated that computing resources are conserved by merely having online promotional gifts be sent by online users determined to be eligible to be promoters (e.g., so that fewer online promotional gifts are sent overall and/or that a higher rate of conversion is likely to be achieved for online promotional gifts that are sent). At 112, the method ends.

Figure 2A:
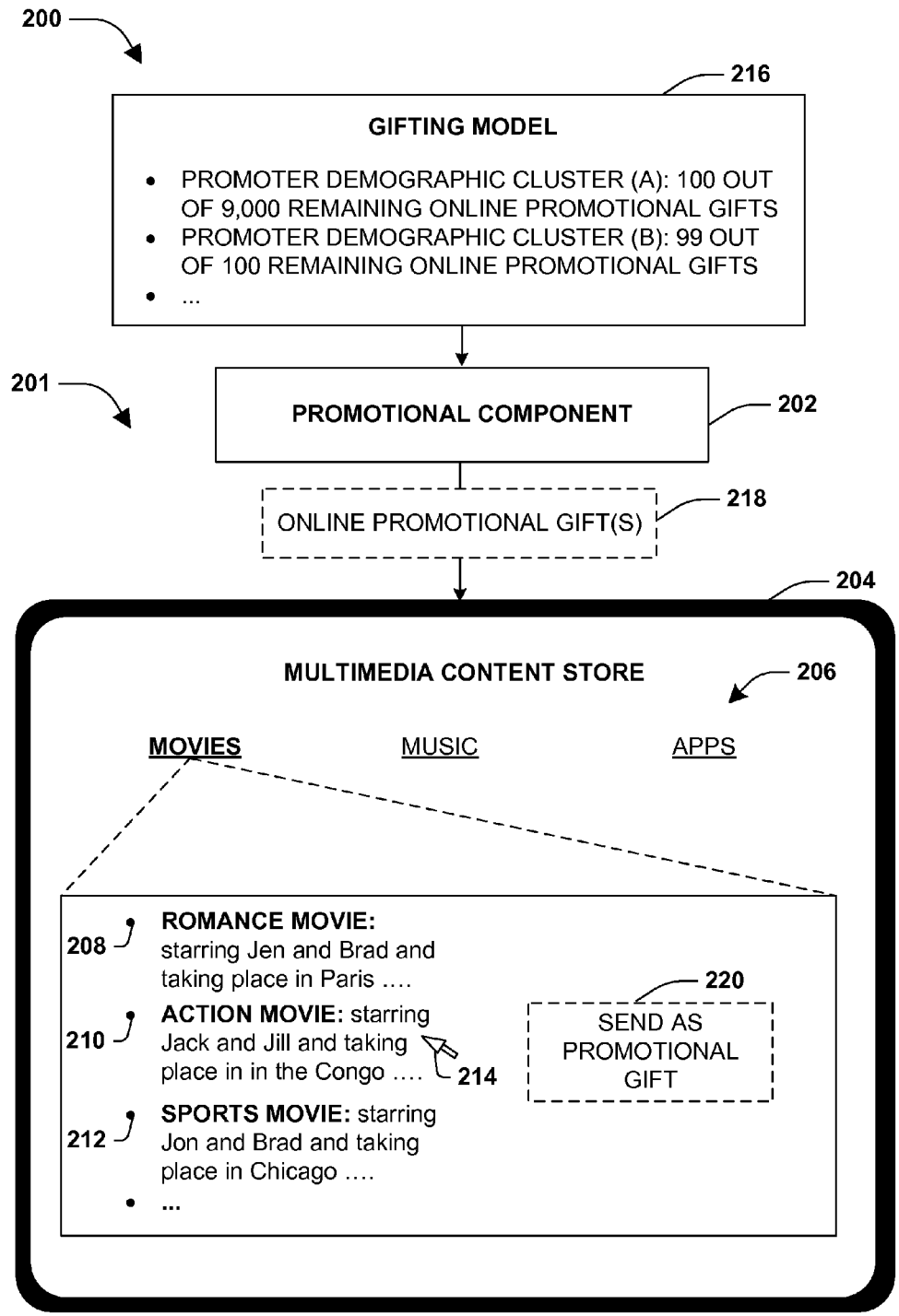
FIG. 2A is a component block diagram illustrating an exemplary system for promoting a service using a gifting model, where one or more online promotional gifts are exposed to an online user.

FIGS. 2A-2D illustrate examples of a system 201, comprising a promotional component 202, for promoting a service using a gifting model 216. FIG. 2A illustrates an example 200 of the promotional component 202 being associated with a service, such as a multimedia content service, that hosts a service user interface, such as a multimedia content store 206 through which users may purchase content such as movies, music, apps, etc. An online user (e.g., a male teenager) may access the multimedia content store 206 through a client device 204 (e.g., a personal computer, a mobile device, a tablet, etc.). The online user may navigate to a movies section populated with a romance movie 208, an action movie 210, a sports movie 212, and/or other movies available for consumption (e.g., rental, purchase, etc.).

The promotional component 202 may generate and/or maintain the gifting model 216 that is associated with the multimedia content service. The gifting model 216 may be populated with one or more promoter demographic clusters corresponding to demographics of users (e.g., movie lovers, professional sports athletes, teenagers, parents, adults, females, males, dog owners, etc. which may be indicative of the type of content that online users may find interesting to share or have shared with them). For example, a promoter demographic cluster (A) may correspond to male teenagers, and one or more online promotional gifts that may be interesting to male teenagers may be assigned to the promoter demographic cluster (A) (e.g., an initial amount of 9,000 online promotional gifts, such as action movies and rock songs, may be assigned to the promoter demographic cluster (A), and currently 100 online promotional gifts may remain available). A promoter demographic cluster (B) may correspond to parents with toddlers, and one or more online promotional gifts that may be interesting to toddler parents may be assigned to the promoter demographic cluster (B) (e.g., an initial amount of 100 online promotional gifts, such as educational television shows and alphabet songs, may be assigned to the promoter demographic cluster (B), and currently 99 online promotional gifts may remain available).

In an example, the online user may select 214 the action movie 210 available to purchase through the multimedia content store 206. Responsive to the selection 214, the promotional component 202 may expose 218 one or more online promotional gifts through the multimedia content store 206. For example, a gifting user interface element 220 may be displayed through the multimedia content store 206 such that the online user may send the action movie 210 as an online promotional gift to an online recipient user using the gifting user interface element 220. In an example, the gifting user interface element 220 for the action movie 210 may be exposed 218 based upon the online user corresponding to the promoter demographic cluster (A) (e.g., the online user is a male teenager) and the promoter demographic cluster (A) indicating that the action movie 210 is an available promotional gift.

Figure 2B:
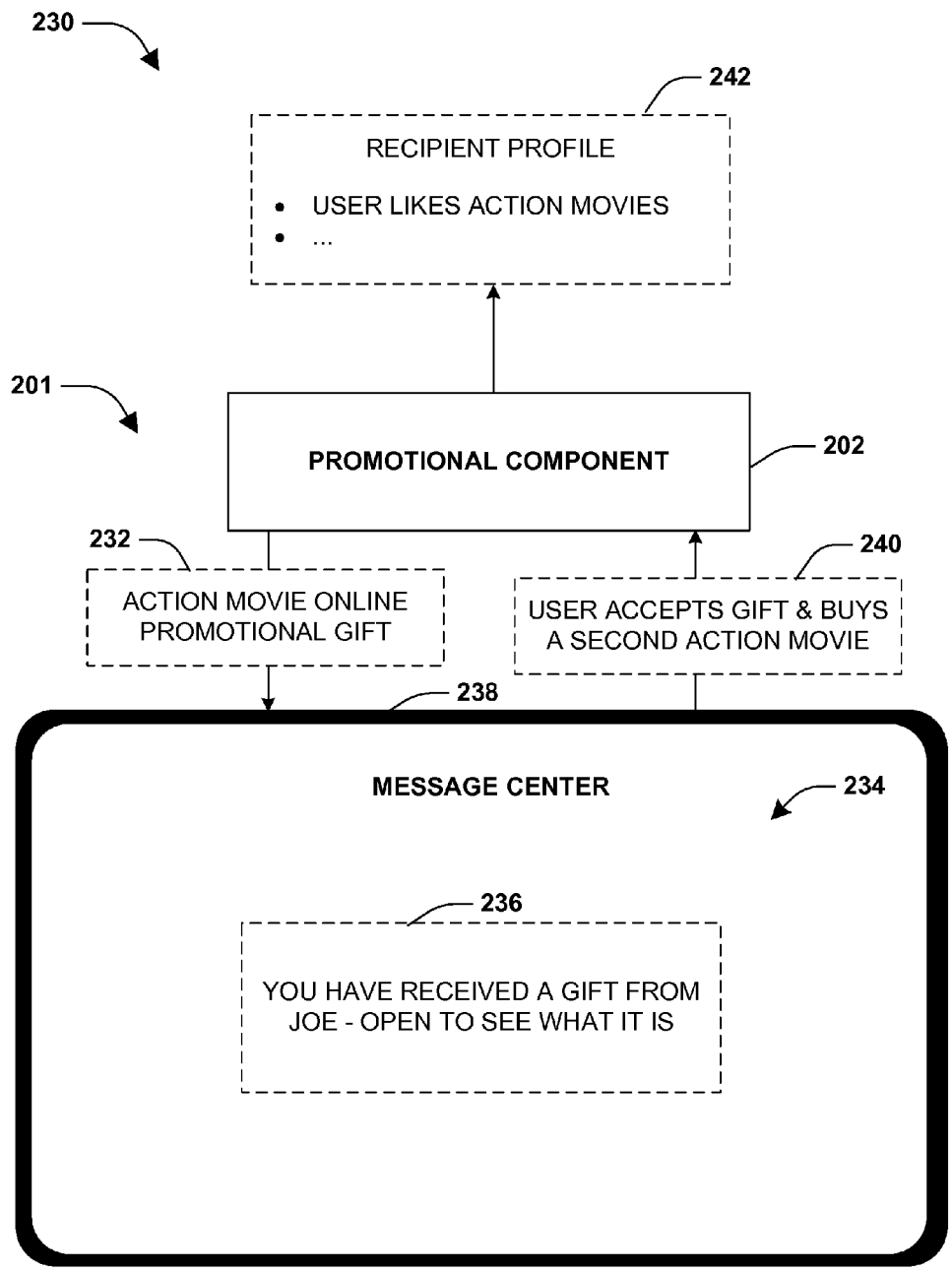
FIG. 2B is a component block diagram illustrating an exemplary system for promoting a service using a gifting model, where an online promotional gift is provided to an online recipient user.

FIG. 2B illustrates an example 230 of the promotional component 202 providing an action movie online promotional gift 232 to the online recipient user based upon the online user invoking the gifting user interface element 220 for the action movie 210 (e.g., illustrated in FIG. 2A). For example, the promotional component 202 may send a message 236 of the action movie online promotional gift 232 to a message center 234 accessible to a recipient client device 238 associated with the online recipient user. The online recipient user may accept and access the action movie online promotional gift 232 using the message 236. For example, the message 236 may be associated with a content access token for accessing the action movie online promotional gift 232, such as an ability to view the action movie 210 (e.g., by clicking on message 236). In an example, the promotional component 202 may determine a result 240 of the action movie online promotional gift 232. For example, the online recipient user may accept the action movie online promotional gift 232, watch the action movie online promotional gift 232, and/or purchase a second action movie from the multimedia content store 206. The promotional component 202 may generate a recipient profile 242 for the online recipient user. The promotional component 202 may indicate through the recipient profile 242 that the online recipient user may have an interest in action movies.

Figure 2C:
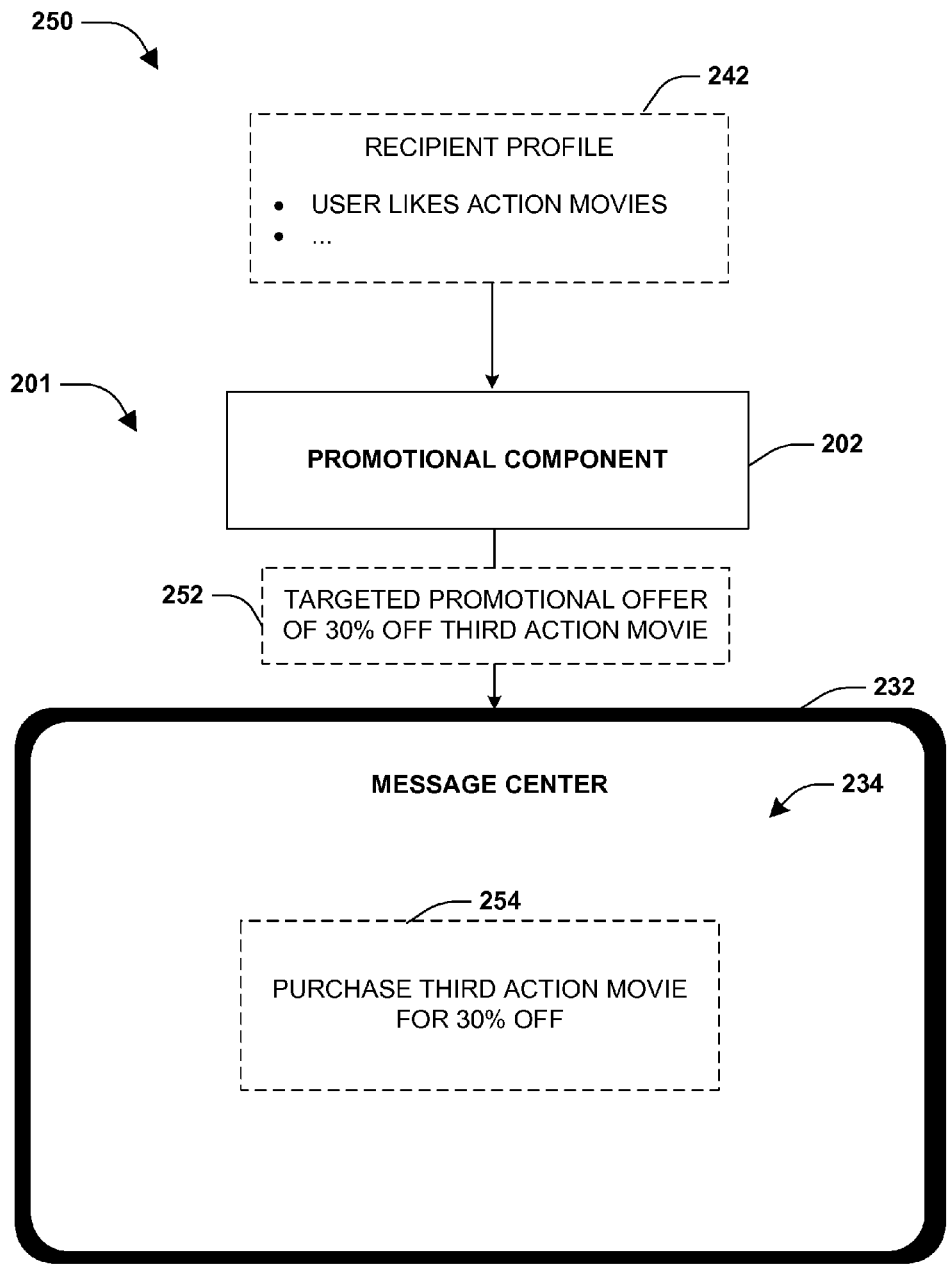
FIG. 2C is a component block diagram illustrating an exemplary system for promoting a service using a gifting model, where a targeted promotional offer is provided to an online recipient user.

FIG. 2C illustrates an example 250 of the promotional component 202 providing a targeted promotional offer 252 based upon a content type user interest of the online recipient user. For example, the recipient profile 242 may indicate that the online recipient user may have an interest in action movies. The promotional component 202 may generate the targeted promotional offer 252 as an offer for the online recipient user to purchase a third action movie at a 30% discount. The promotional component 202 may provide the targeted promotional offer 252 through a promotional message 254 that is provided to the message center 234. In this way, promotional content may be targeted to online recipient users based upon results and/or metrics of promotional gifting.

Figure 2D:
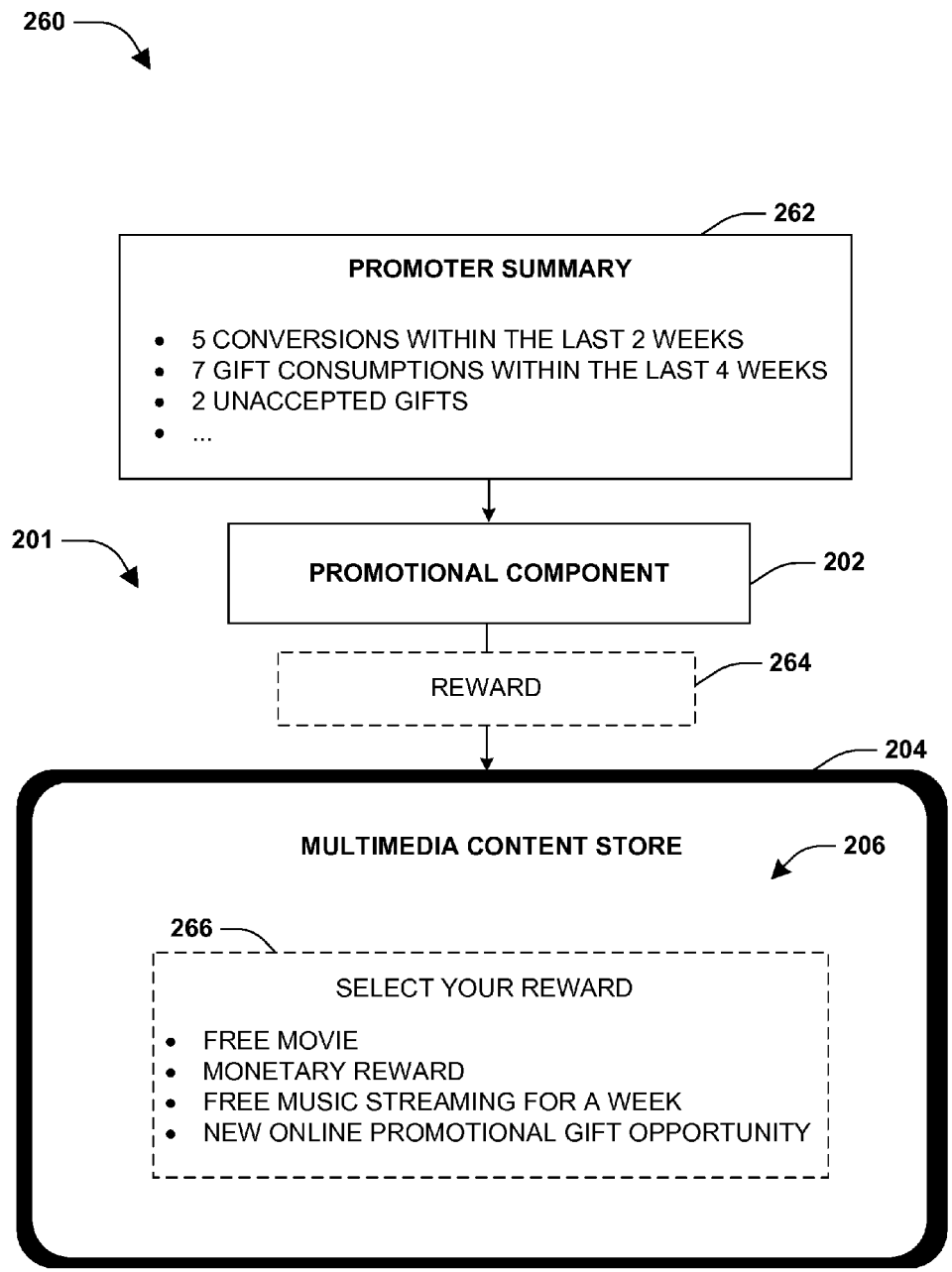
FIG. 2D is a component block diagram illustrating an exemplary system for promoting a service using a gifting model, where a reward is provided to an online user.

FIG. 2D illustrates an example 260 of the promotional component 202 providing the online user with a reward 264. For example, the promotional component 202 may maintain a promoter summary 262 for the online user. The promoter summary 262 may detail online promotional gifting attempts by the online user and/or results of the online promotional gifting attempts. For example, 5 online promotional gifts by the online user may have resulted in conversions (e.g., a subscription to or purchases from the multimedia content source), 7 online promotional gifts by the online user may have been consumed by online recipient users, 2 online promotional gifts by the online user may have not been accepted, etc. The promotional component 202 may present the reward 264 through a reward interface 266 where the online user may select a free movie, a monetary reward, a free music streaming service for a week, a new online promotional gift opportunity as the reward 264, etc. In this way, online users may be incentivized to send promotional gifts to online recipient users in a targeted manner that may result in conversions.

Figure 3A:
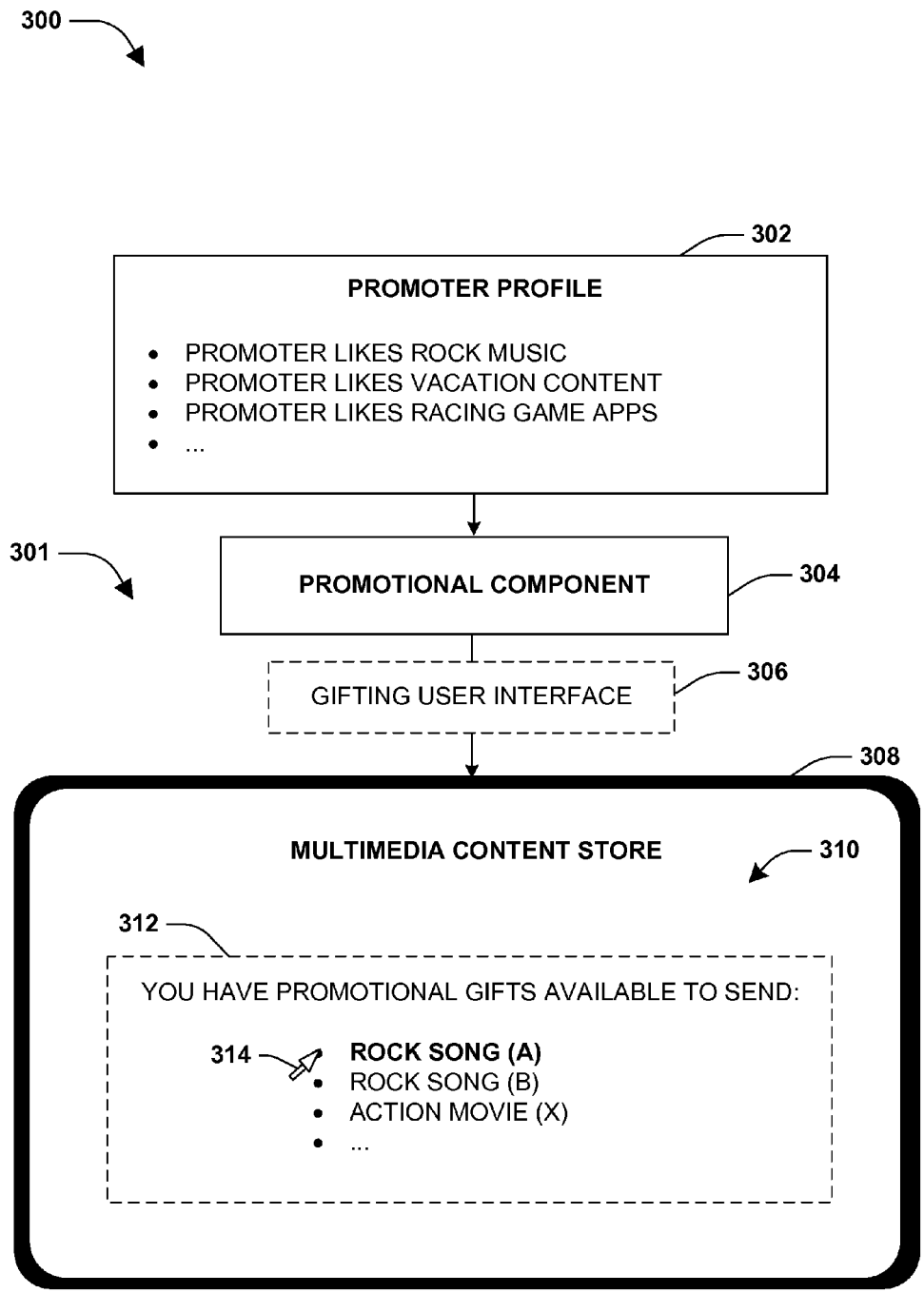
FIG. 3A is a component block diagram illustrating an exemplary system for promoting a service using a gifting model, where a gifting user interface is provided to an online user.
Figure 3B:
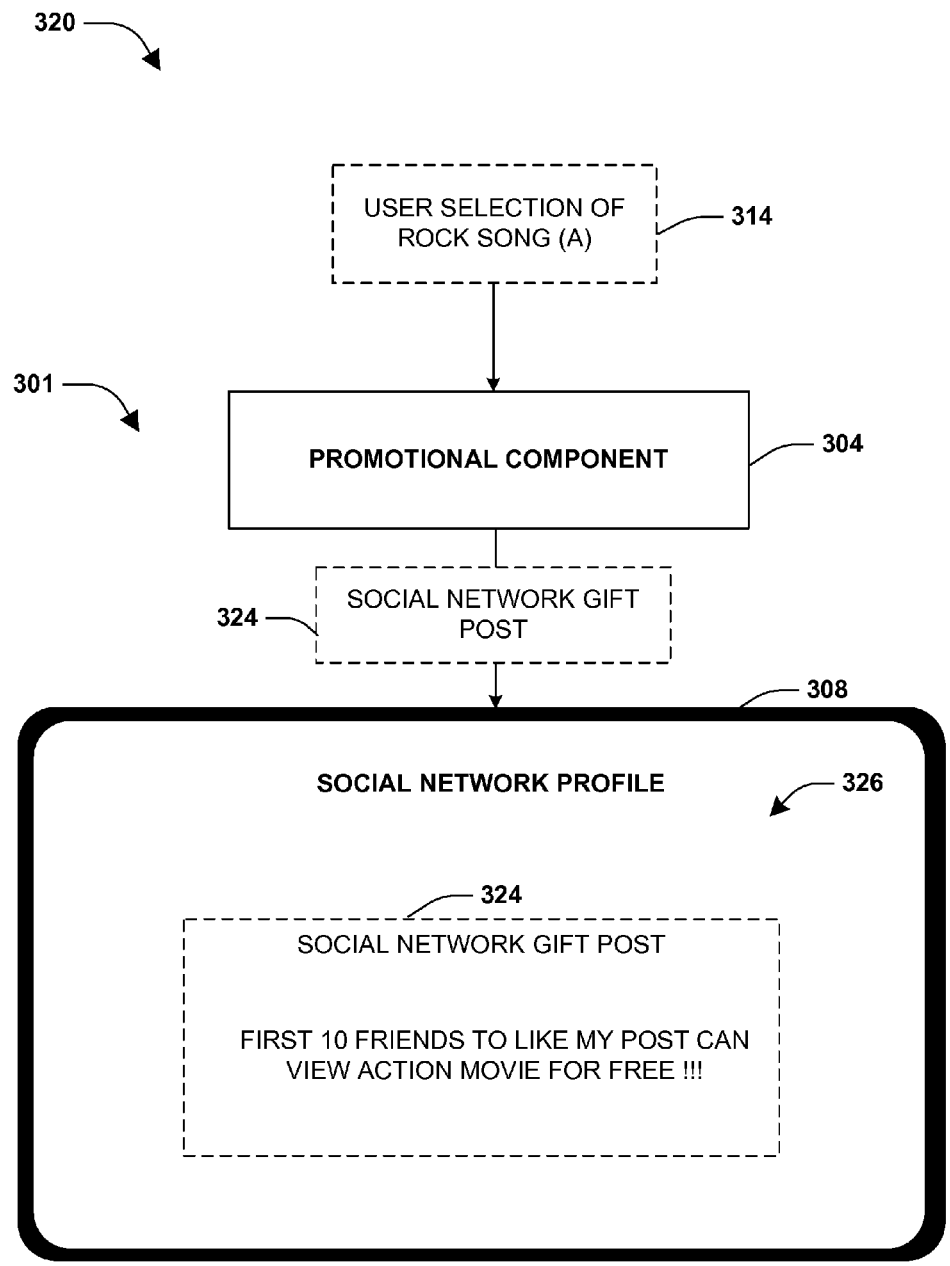
FIG. 3B is a component block diagram illustrating an exemplary system for promoting a service using a gifting model, where a social network gift post is provided through a social network profile.

FIGS. 3A and 3B illustrate examples of a system 301, comprising a promotional component 304, for promoting a service such as a multimedia content service using a gifting model. FIG. 3A illustrates the promotional component 304 maintaining a promoter profile 302 associated with an online user that has promoted the multimedia content service by providing online promotional gifts to online recipient users. The promotional component 304 may identify, through the promoter profile 302, interests of the online user based upon various information such as a type of online promotional gifts previously provided by the online user to online recipient users (e.g., the online user may have provided rock music songs to online recipient users through online promotional gifts), content of the service(s) consumed by the online user (e.g., the user may have purchased various racing game apps), social network information (e.g., the user may share and/or view other social network user's vacation photos), and/or other information.

The promotional component 304 may provide a gifting user interface 306 to the online user, such as through a multimedia content store 310 accessed by a client device 308 from the multimedia content service. For example, the gifting user interface 306 may display one or more promotional gifts 312 that are available for the online user to gift to online recipient users. For example, the online user may select 314 a rock song (A) online promotional gift to share through a social network profile. FIG. 3B illustrates an example 320 of the promotional component 304 creating a social network gift post 324 to post to the social network profile 326 (e.g., of the online user). For example, the social network gift post 324 may specify that a threshold number of online recipient users, such as the first 10 friends to like the social network gift post 324, are capable of gaining access to the rock song (A) online promotional gift. In this way, the online user may promote the multimedia content service through social network gift posts.

Figure 4:
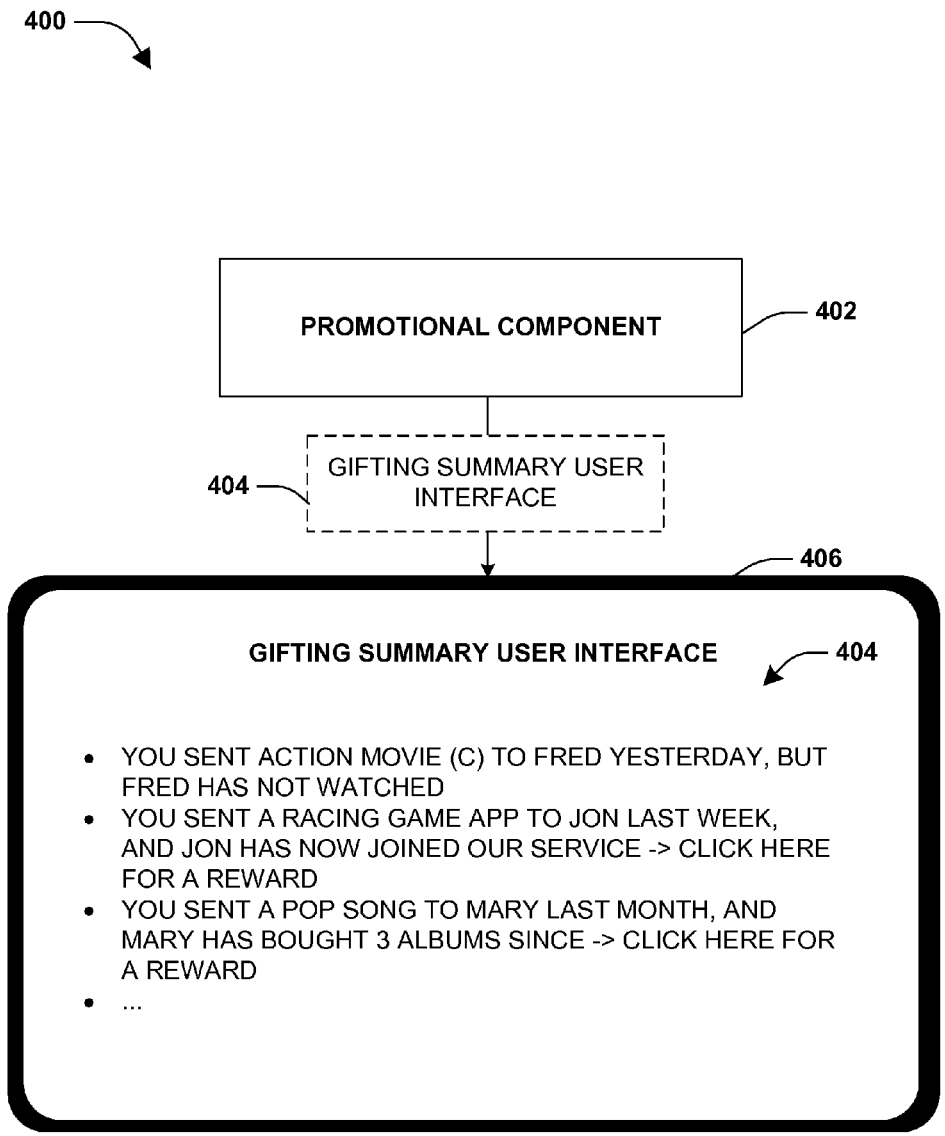
FIG. 4 is a component block diagram illustrating an exemplary system for promoting a service using a gifting model, where a gifting summary user interface is provided.

FIG. 4 illustrates an example of a system 400, comprising a promotional component 402, for providing an online user with a gifting summary user interface 404. For example, the online user may have promoted a service by providing, through the promotional component 402, online promotional gifts to online recipient users. The promotional component 402 may maintain a promoter summary detailing online promotional gifts previously provided by the online user and results of the online promotional gifts. The promotional component 402 may populate the gifting summary user interface 404 with information from the promoter summary, such as an indication that the online user sent an Action Movie (C) to Fred yesterday and that Fred has not yet watched the Action Movie (C), that the online user sent a Racing Game App to Jon last week and that Jon has subscribed to the service and thus the online user can obtain a reward, that the online user sent a pop song to Mary last month and that Mary has since bought 3 albums and thus the online user can obtain a reward, etc. The gifting summary user interface 404 may be provided to a client device 406 for access by the online user.

According to an aspect of the instant disclosure, a method for promoting a service using a gifting model is provided. The method includes utilizing a gifting model to evaluate an online user to determine that the online user is eligible to be a promoter for promotion based gifting. The method includes exposing one or more online promotional gifts of a service to the online user. The method includes receiving a gift request from the online user. The gift request specifies an online recipient user and an online promotional gift selected from the one or more online promotional gifts. The method includes providing the online promotional gift to the online recipient user.

According to an aspect of the instant disclosure, a system for promoting a service using a gifting model is provided. The system includes a promotional component. The promotional component is configured to utilize a gifting model to evaluate an online user to determine that the online user is eligible to be a promoter for promotion based gifting. The promotional component is configured to expose one or more online promotional gifts of a service to the online user. The promotional component is configured to receive a gift request from the online user. The gift request specifies an online recipient user and an online promotional gift selected from the one or more online promotional gifts. The promotional component is configured to provide the online promotional gift to the online recipient user According to an aspect of the instant disclosure, a computer readable medium comprising instructions which when executed perform a method for promoting a service is provided. The method includes responsive to an online user accessing a content item of a service through a service user interface, populating the service user interface with a gifting user interface element that exposes the content item as an online promotional gift. The method includes receiving a gift request from the online user, the gift request specifies an online recipient user as a recipient for the online promotional gift. The method includes providing the online promotional gift to the online recipient user.

According to an aspect of the instant disclosure, a means for promoting a service using a gifting model is provided. A gifting model is utilized to evaluate an online user to determine that the online user is eligible to be a promoter for promotion based gifting, by the means for promoting a service. One or more online promotional gifts of a service are exposed to the online user, by the means for promoting a service. A gift request is received from the online user, by the means for promoting a service. The gift request specifies an online recipient user and an online promotional gift selected from the one or more online promotional gifts. The online promotional gift is provided to the online recipient user, by the means for promoting a service.

According to an aspect of the instant disclosure, a means for promoting a service is provided. Responsive to an online user accessing a content item of a service through a service user interface, the service user interface is populated with a gifting user interface element exposing the content item as an online promotional gift, by the means for promoting a service. A gift request is received from the online user, by the means for promoting a service. The gift request specifies that an online recipient user is to be a recipient for the online promotional gift. The online promotional gift is provided to the online recipient user, by the means for promoting a service.

Figure 5:
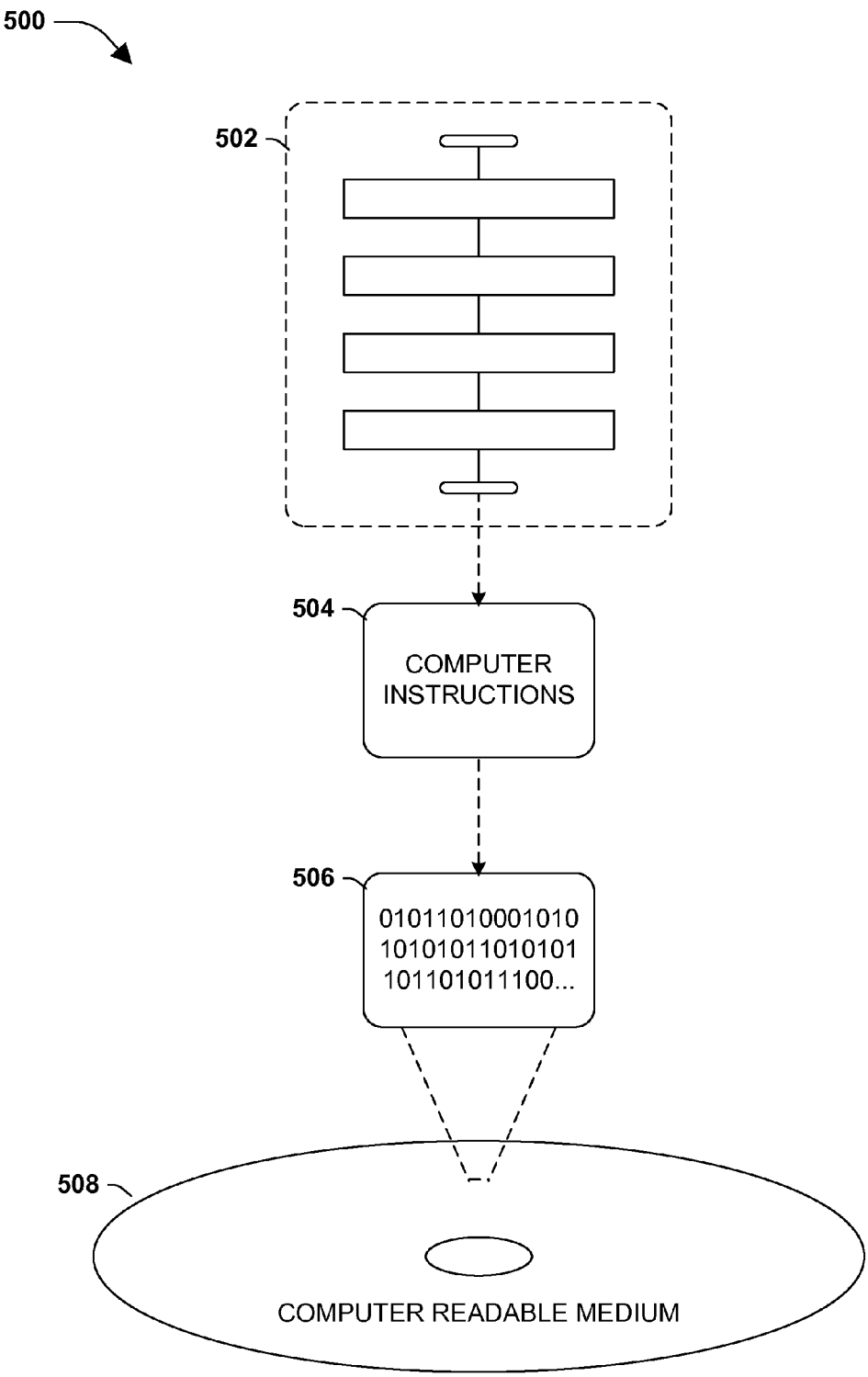
FIG. 5 is an illustration of an exemplary computer readable medium wherein processor-executable instructions configured to embody one or more of the provisions set forth herein may be comprised.

Still another embodiment involves a computer-readable medium comprising processor-executable instructions configured to implement one or more of the techniques presented herein. An example embodiment of a computer-readable medium or a computer-readable device is illustrated in FIG. 5, wherein the implementation 500 comprises a computer-readable medium 508, such as a CD-R, DVD-R, flash drive, a platter of a hard disk drive, etc., on which is encoded computer-readable data 506. This computer-readable data 506, such as binary data comprising at least one of a zero or a one, in turn comprises a set of computer instructions 504 configured to operate according to one or more of the principles set forth herein. In some embodiments, the processor-executable computer instructions 504 are configured to perform a method 502, such as at least some of the exemplary method 100 of FIG. 1, for example. In some embodiments, the processor-executable instructions 504 are configured to implement a system, such as at least some of the exemplary system 201 of FIGS. 2A-2D, at least some of the exemplary system 301 of FIGS. 3A and 3B, and/or at least some of the exemplary system 400 of FIG. 4, for example. Many such computer-readable media are devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

As used in this application, the terms "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 6:
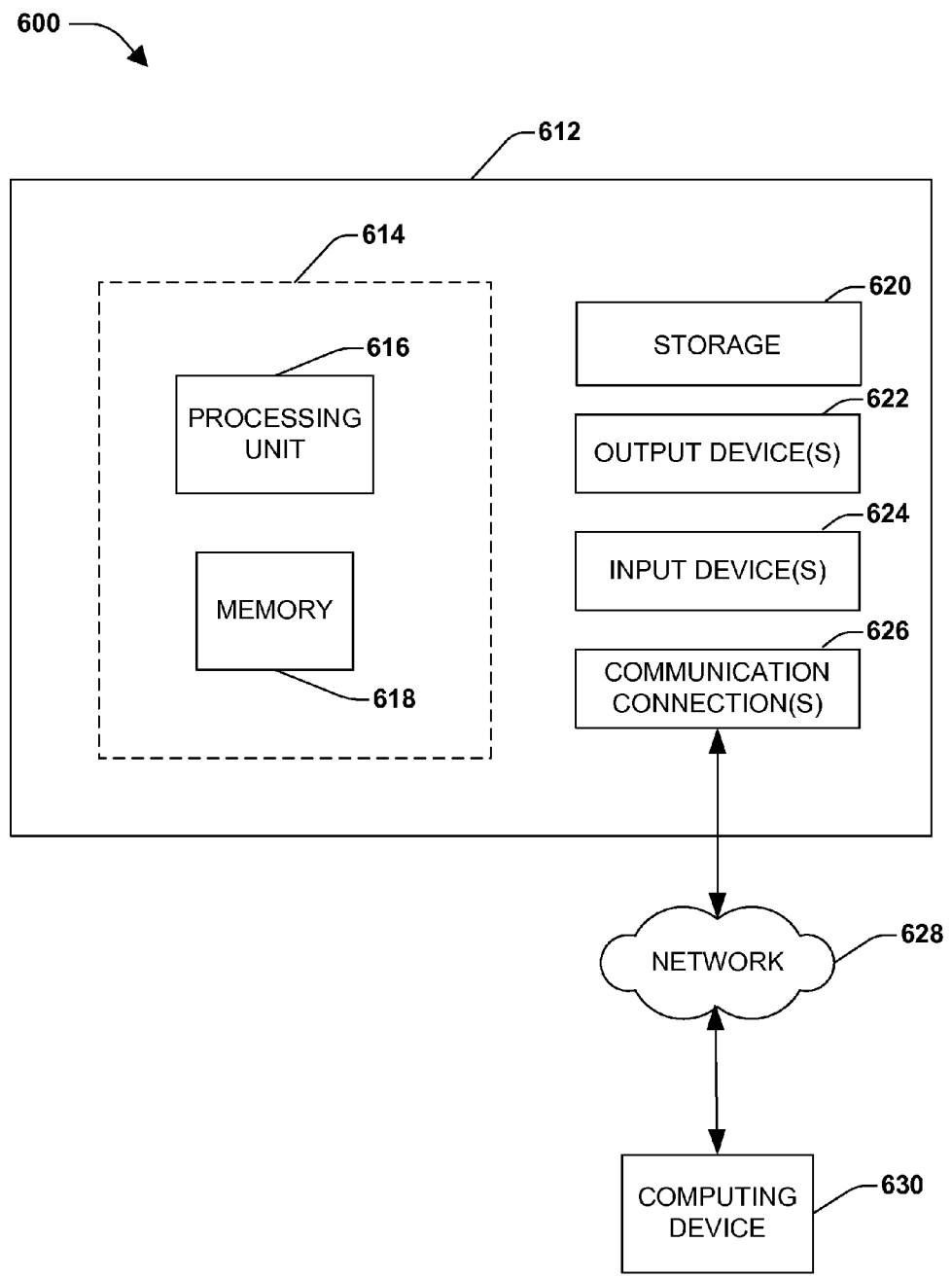
FIG. 6 illustrates an exemplary computing environment wherein one or more of the provisions set forth herein may be implemented.

FIG. 6 and the following discussion provide a brief, general description of a suitable computing environment to implement embodiments of one or more of the provisions set forth herein. The operating environment of FIG. 6 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 6 illustrates an example of a system 600 comprising a computing device 612 configured to implement one or more embodiments provided herein. In one configuration, computing device 612 includes at least one processing unit 616 and memory 618. Depending on the exact configuration and type of computing device, memory 618 may be volatile (such as RAM, for example), non-volatile (such as ROM, flash memory, etc., for example) or some combination of the two. This configuration is illustrated in FIG. 6 by dashed line 614.

In other embodiments, device 612 may include additional features and/or functionality. For example, device 612 may also include additional storage (e.g., removable and/or non-removable) including, but not limited to, magnetic storage, optical storage, and the like. Such additional storage is illustrated in FIG. 6 by storage 620. In one embodiment, computer readable instructions to implement one or more embodiments provided herein may be in storage 620. Storage 620 may also store other computer readable instructions to implement an operating system, an application program, and the like. Computer readable instructions may be loaded in memory 618 for execution by processing unit 616, for example.

The term "computer readable media" as used herein includes computer storage media. Computer storage media includes volatile and nonvolatile, removable and non-removable media implemented in any method or technology for storage of information such as computer readable instructions or other data. Memory 618 and storage 620 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 612. Computer storage media does not, however, include propagated signals. Rather, computer storage media excludes propagated signals. Any such computer storage media may be part of device 612.

Device 612 may also include communication connection(s) 626 that allows device 612 to communicate with other devices. Communication connection(s) 626 may include, but is not limited to, a modem, a Network Interface Card (NIC), an integrated network interface, a radio frequency transmitter/receiver, an infrared port, a USB connection, or other interfaces for connecting computing device 612 to other computing devices. Communication connection(s) 626 may include a wired connection or a wireless connection. Communication connection(s) 626 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 612 may include input device(s) 624 such as keyboard, mouse, pen, voice input device, touch input device, infrared cameras, video input devices, and/or any other input device. Output device(s) 622 such as one or more displays, speakers, printers, and/or any other output device may also be included in device 612. Input device(s) 624 and output device(s) 622 may be connected to device 612 via a wired connection, wireless connection, or any combination thereof. In one embodiment, an input device or an output device from another computing device may be used as input device(s) 624 or output device(s) 622 for computing device 612.

Components of computing device 612 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 612 may be interconnected by a network. For example, memory 618 may be comprised of multiple physical memory units located in different physical locations interconnected by a network.

Those skilled in the art will realize that storage devices utilized to store computer readable instructions may be distributed across a network. For example, a computing device 630 accessible via a network 628 may store computer readable instructions to implement one or more embodiments provided herein. Computing device 612 may access computing device 630 and download a part or all of the computer readable instructions for execution. Alternatively, computing device 612 may download pieces of the computer readable instructions, as needed, or some instructions may be executed at computing device 612 and some at computing device 630.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Further, unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "exemplary" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", and/or variants thereof are used in either the detailed description or the claims, such terms are intended to be inclusive in a manner similar to the term "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method for promoting a service using a gifting model, comprising:
   assigning, by a promotional component executed by one or more computing devices, one or more available online promotional gifts to one or more promoter demographic clusters to construct the gifting model, wherein the online promotional gifts correspond to content, otherwise available for purchase from the service, which is gifted to an online recipient user by an online user for free or at a reduced rate;
   evaluating, via the gifting model by the promotional component, the online user to determine, based on demographic information of the online user, that the online user is eligible to be a promoter for promotion based gifting;
   responsive to the online user corresponding to a promoter demographic cluster of the one or more promoter demographic clusters, determining, by the promotional component, that the online user is eligible to be the promoter;
   generating, by the promotional component, a content type user interest of the online user based at least on accessing a social network profile of the online user, content purchased by the online user from a content multimedia service, and types of online promotional gifts previously provided by the online user to online recipient users;
   exposing, by the promotional component, one or more online promotional gifts of a service to the online user based on the content type user interest of the online user through a service user interface on a computing device associated with the online user;
   receiving, by the promotional component, a gift request from the online user, the gift request specifying the online recipient user and an online promotional gift selected from the one or more online promotional gifts; and
   providing, by the promotional component, the online promotional gift to the online recipient user in response to the gift request received from the online user.

2. The method of claim 1, comprising:
   responsive to the online recipient user corresponding to a social network user profile, creating a social network gift post of the online promotional gift.

3. The method of claim 2, the creating a social network gift post comprising:
   using the social network gift post to specify a threshold number of online recipient users capable of gaining access to the online promotional gift.

4. The method of claim 1, the utilizing a gifting model comprising:
   providing the online user with an online promotional test gift opportunity corresponding to an online promotional test gift; and
   evaluating a result of the online promotional test gift opportunity to determine whether the online user is eligible to be the promoter, the result comprising at least one of a target online recipient user of the online promotional test gift or whether a conversion results from the online promotional test gift opportunity.

5. The method of claim 4, the conversion comprising at least one of the online target recipient using the online promotional test gift, the online target recipient joining the service, or the online target recipient making a purchase from the service.

6. The method of claim 1, the utilizing a gifting model comprising:
   identifying a location of the online user having an account with the service; and
   responsive to the location corresponding to a threshold number of online users, determining that the online user is not eligible to be the promoter.

7. The method of claim 1, the exposing one or more online promotional gifts comprising:
   identifying a content type user interest of the online user based upon content consumed by the online user through the service; and
   including a first online promotional gift within the one or more online promotional gifts based upon the first online promotional gift corresponding to the content type user interest.

8. The method of claim 1, comprising:
   identifying a content type user interest of the online recipient user based upon the online promotional gift; and
   providing a targeted promotional offer to the online recipient user based upon the content type user interest.

9. The method of claim 1, comprising:
   generating a promoter profile for the online user based upon one or more online promotional gifts provided to online recipient users on behalf of the online user.

10. The method of claim 1, comprising:
    generating a recipient profile for the online recipient user based upon one or more online promotional gifts consumed by the online recipient user.

11. The method of claim 1, comprising:
    identifying a result of the online promotional gift; and
    providing the online user with a reward based upon the result indicating a conversion based upon the online promotional gift.

12. The method of claim 11, the reward comprising at least one of access to content provided by the service, a monetary reward, access to a service feature of the service, or a new online promotional gift opportunity.

13. The method of claim 1, the exposing one or more online promotional gifts to the online user comprising:
    responsive to the online user accessing a content item of the service through a service user interface, populating the service user interface with a gifting user interface element exposing the content item as the online promotional gift.

14. The method of claim 1, the exposing one or more online promotional gifts to the online user comprising:

displaying a gifting user interface to the online user; and populating the gifting user interface with the one or more online promotional gifts based upon a promoter profile of the online user.

15. The method of claim 1, comprising:

displaying a gifting summary user interface to the online user; and populating the gifting summary user interface with one or more previously provided online promotional gifts and previous online recipient users of the one or more previously provided online promotional gifts.

16. The method of claim 1, the providing the online promotional gift to the online recipient user comprising:

generating a content access token for accessing content of the online promotional gift; and providing the content access token to the online recipient user based upon at least one of an email, a message, a social network post, a URL, or a text message.

17. A system for promoting a service using a gifting model, comprising:

a processing unit;

memory; and a promotional component stored in the memory that, when executed by the processing unit, directs the processing unit to:

assign one or more available online promotional gifts to one or more promoter demographic clusters to construct a gifting model, wherein the online promotional gifts correspond to content, otherwise available for purchase from the service, which is gifted to an online recipient user by an online user for free or at a reduced rate;

evaluate, via the gifting model, the online user to determine, based on demographic information of the online user, that the online user is eligible to be a promoter for promotion based gifting;

responsive to the online user corresponding to a promoter demographic cluster of the one or more promoter demographic clusters, determine that the online user is eligible to be the promoter;

generate, by the promotional component, a content type user interest of the online user based at least on accessing a social network profile of the online user, content purchased by the online user from a content multimedia service, and types of online promotional gifts previously provided by the online user to online recipient users;

expose one or more online promotional gifts of a service to the online user based on the content type user interest of the online user through a service user interface on a computing device associated with the online user;

receive a gift request from the online user, the gift request specifying the online recipient user and an online promotional gift selected from the one or more online promotional gifts; and provide the online promotional gift to the online recipient user in response to the gift request received from the online user.

* * * * *